United States Patent
Hackett et al.

[11] 3,736,584
[45] May 29, 1973

[54] MOTION DETECTOR AND INTRUDER ALARM SYSTEM

[75] Inventors: Kenneth R. Hackett, Boulder; Ralph W. Goble, Boulder, both of Colo.

[73] Assignee: Sontrix, Inc., Boulder, Colo.

[22] Filed: Aug. 13, 1971

[21] Appl. No.: 171,420

[52] U.S. Cl.............340/258 A, 340/16 R, 340/276
[51] Int. Cl..............................................G08b 13/16
[58] Field of Search...............340/258 A, 1 R, 3 D, 340/258 A, 258 B; 343/5 PD, 7.7

[56] References Cited
UNITED STATES PATENTS 3,525,976   8/1970   Wilcox et al.......................340/1 R
3,629,812   12/1971   Amato............................340/258 A

*Primary Examiner*—David L. Trafton
*Attorney*—Anderson, Spangler & Wymore

[57] ABSTRACT

Sound is generated at a reference frequency within a selected area to be protected and a plurality of sound sensing transducers are positioned to individually sense echo signals carrying Doppler beat frequencies produced by the movement of an object, hence an intruder, within the protected area. Amplifiers substantially isolated from electrical interference are connected to each transducer to amplify each sensed signal and the amplified signals are summed and processed to detect the Doppler beat frequency and generate an alarm actuating signal to indicate the presence of an intruder.

15 Claims, 6 Drawing Figures

INVENTORS
KENNETH R. HACKETT
RALPH W. GOBLE
Anderson, Spangler & Wymore
ATTORNEYS

INVENTORS
KENNETH R. HACKETT
RALPH W. GOBLE

INVENTORS
KENNETH R. HACKETT
RALPH W. GOBLE
Anderson, Spangler & Wymore
ATTORNEYS

MOTION DETECTOR AND INTRUDER ALARM SYSTEM

BACKGROUND OF THE INVENTION

The present invention relates to the detection of moving objects and more particularly to an improved motion detection system and alarm apparatus suitable for detecting the presence of intruders within a protected area.

Heretofore, sound operated intruder alarm systems for monitoring an area to be protected have been devised. Because of distances covered by the electrical cables associated with such systems, generally these systems have been extremely susceptible to electrical interference, particularly VHF interference, induced in their cables by power lines, radio transmitters, etc., and to other types of stray electrical noise. Additionally, some of the prior art intruder alarm systems have been designed to monitor ambient sound as well as the movement of objects within the protected area, the object of monitoring ambient sound being to detect an intruder by the noise the intruder makes when traversing the protected area. Unfortunately, making such systems sensitive to ambient sound has the severe drawback of making the systems susceptible to false alarms caused by loud sounds caused by sources other than by an intruder within the protected area.

SUMMARY OF THE INVENTION

It is, accordingly, an object of the present invention to provide an improved system for monitoring the motion of objects within a protected area suitable for use as an intruder alarm which is sound operated yet substantially insensitive to electrical interference and ambient noise so as to obviate the aforementioned disadvantages of the prior art systems.

It is further an object of the present invention to provide an improved intruder alarm system which generates sound at a reference frequency within an area to be protected and detects echo signals carrying Doppler beat frequency signals produced by the movement of an object within the area which is characterized by having a plurality of sound detecting transducers associated with individual amplifiers so that each signal sensed is amplified prior to being summed together and processed so as to increase the system's signal to noise ratio.

It is also an object of the present invention to provide an improved intruder alarm system having an improved arrangement for driving a plurality of sound producing transducers.

It is another object of the present invention to provide an improved intruder alarm system having an improved arrangement for detecting frequency shifted doppler signals which increases signal to noise ratio and is operable to reject common mode noise signals equally induced in the signal carrying conductors of the cabling employed in the intruder alarm system.

In accomplishing these and other objects, there is provided an intruder alarm system having a plurality of sound producing transducers designed to generate sound at a predetermined reference frequency. The sound producing transducers are driven by driver means operable to efficiently drive these transducers without using excessive electrical power and the sound producing transducers are positioned to generate the sound waves within an area to be protected so that the sound waves are reflected from objects within the area. Thereby, echo signals at the reference frequency are produced by reflection of the sound waves from stationary objects and frequency shifted echo signals are produced by reflection of the sound waves from moving objects, such as an intruder. The frequency shifted echo signals which are caused by the Doppler frequency shift of sound waves from a moving object combine with the reference echo signals to produce a beat frequency equal to frequency difference between the reference echo signals and the frequency shifted echo signals. A plurality of sound sensing transducers are positioned to sense the echo signals reflected from objects within the area to be protected. Current generating amplifiers are included which are substantially isolated from electrical interference for amplifying individually the echo signals sensed by each sound sensing transducer. The amplifiers have high output impedances and the current signals are summed on a shielded cable terminated in a low impedance to produce a summed output. The cable is coupled to a signal processor and common mode rejecting means are connected between the cable and signal processor to eliminate electrical noise equally induced in the signal carrying conductors of the cable. In the signal processor, the Doppler beat frequency signal is detected, integrated and amplified to produce an alarm actuating signal operative to actuate an alarm to indicate the presence of an intruder within the area. Thus, there is provided an improved intruder alarm system actuated by sound which is substantially insensitive to ambient noise and electrical interference.

Additional objects of the present invention reside in the specific design of the exemplary intruder alarm system hereinafter particularly described in the specification and shown in the several drawings.

DESCRIPTION OF THE PREFERRED EMBODIMENT

Figure 1:
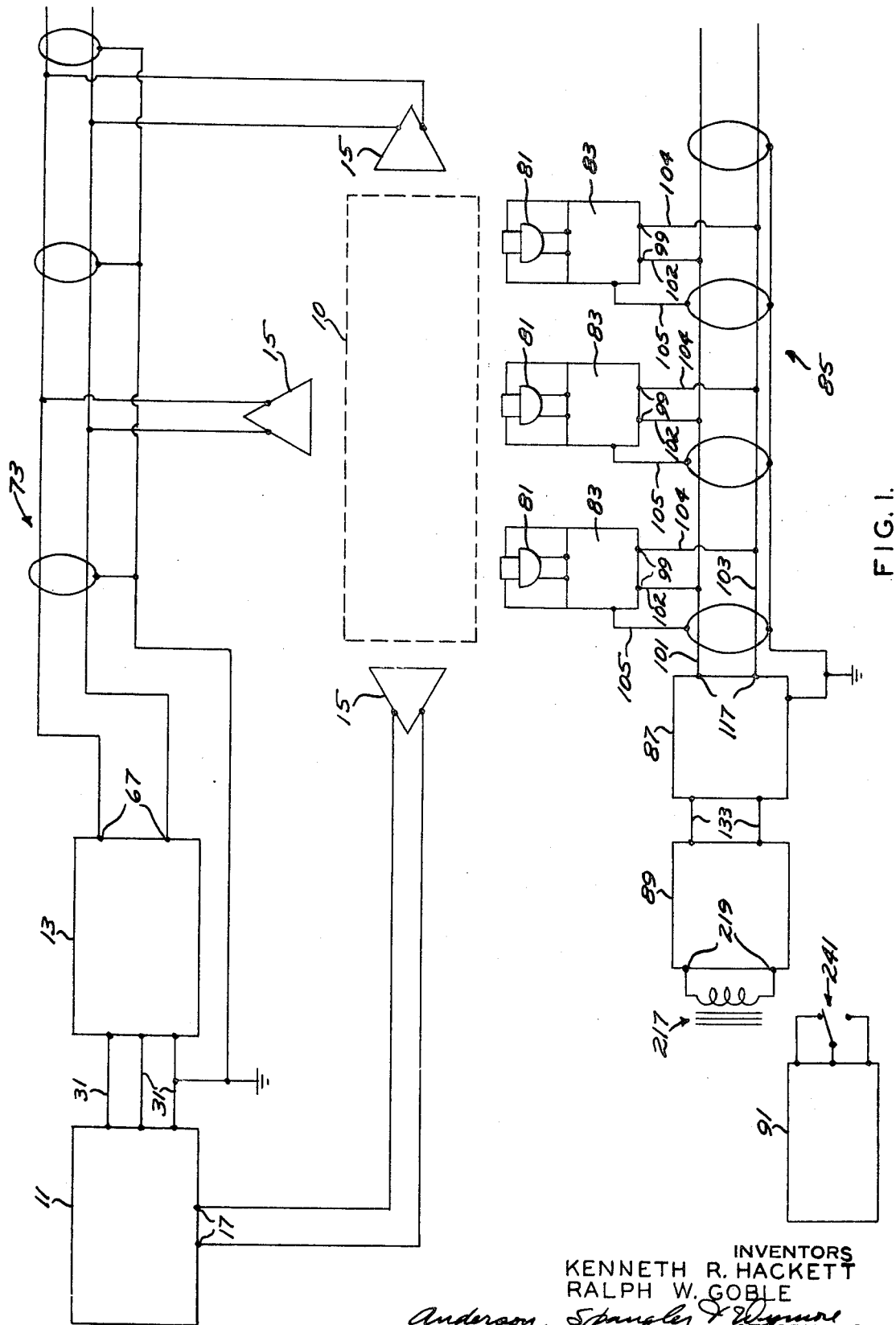
FIG. 1 is a block diagram of a motion detector and intruder alarm system according to the present invention.

Referring to the drawings in more detail, there is shown in FIG. 1 an alarm system for detecting the motion of objects, hence intruders, within a protected area 10 shown in dashed lines. The intruder alarm system includes sound generating means made up of a driving oscillator 11, a driver circuit 13 and a plurality of sound producing transducers or speakers 15. The sound generating transducers 15 are designed to have the same natural resonant frequency which is preferably in the ultrasonic range of the accoustical spectrum, such as a resonant frequency of 26 KHz, and this resonant frequency serves as a reference frequency for the operation of the intruder alarm system.

Figure 2:
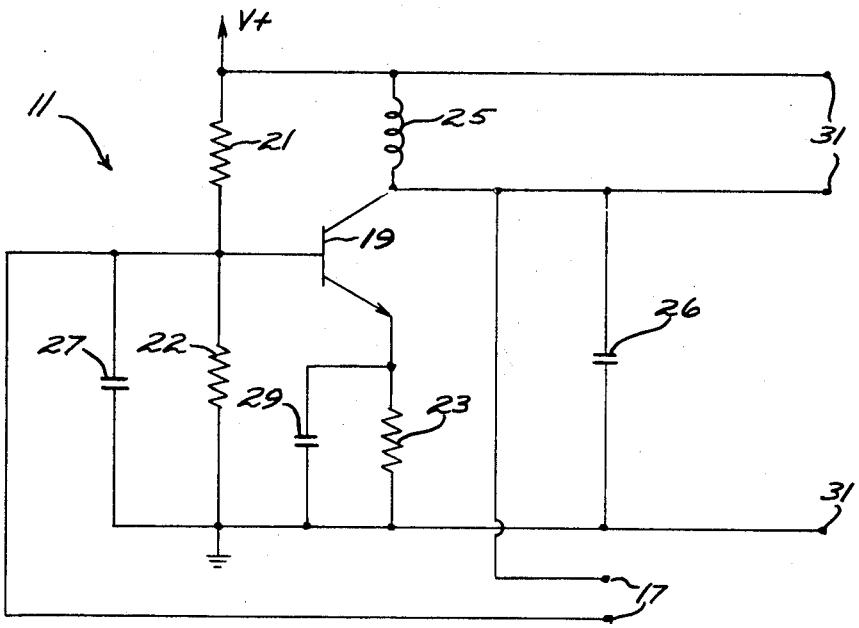
FIG. 2 is a circuit diagram of the driving oscillator of FIG. 1.

The driving oscillator 11 is shown in more detail in FIG. 2 and is connected at its terminals 17 to drive one of the transducers 15 to provide a frequency reference. The oscillator 11 is connected in a conventional manner in the so-called Pierce configuration which is commonly used for quartz crystal oscillators. The oscillator 11 includes an NPN transistor 19, bias resistors 21–23, an L-C resonant circuit formed by a coil 25 and a capacitor 26, an input capacitor 27 and a bypass capacitor 29. The oscillator 11 operates at the natural resonant frequency of the speaker 15 connected to its terminals 17. The collector impedance of the transistor 19 is capacitive and the L-C circuit formed by the inductor 25 and capacitor 26 are dimensioned to resonate at a selected frequency below the reference or natural resonant frequency of the transducer 15. The transistor 19 is biased at a selected operating point by appropriately dimensioning the resistors 21–23 and supplying V+ and ground voltages therethrough. The capacitor 29 is connected in the oscillator 11 as an emitter bypass capacitor for the transistor 19 and the capacitor 27 is connected to provide the transistor 19 a capacitive input reactance. In operation of the oscillator 11, the phase shift due to the capacitance in the circuit and the electromechanical characteristics of the transducer 15 cause the circuit to oscillate at the natural resonant frequency of the transducer 15 and a peak to peak driving voltage is generated on the collector electrode of the transistor 19 which is equal approximately to twice the value of the supply voltage V+. This driving voltage is transmitted over electrical leads 31 to the driver circuit 13.

Figure 3:
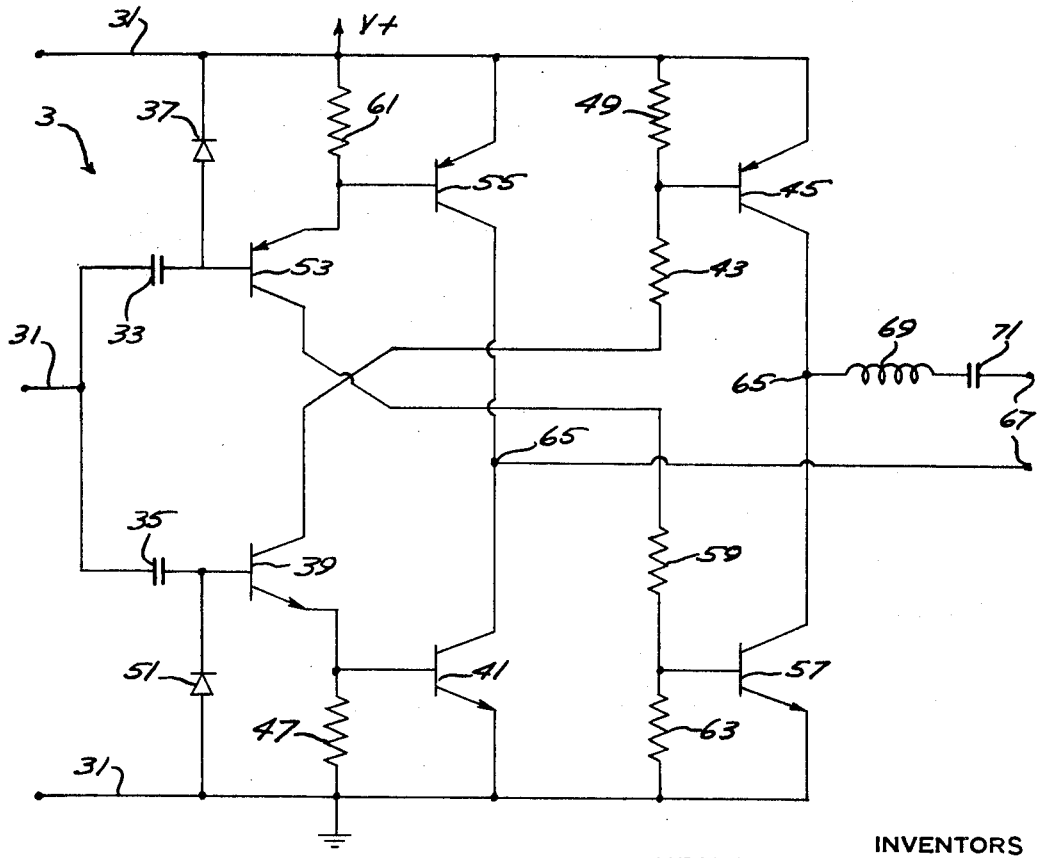
FIG. 3 is a circuit diagram of the driver circuit of FIG. 1.

The driver circuit 13 is shown in detail in FIG. 3 and functions as a driver for a plurality of the sound producing transducers 15. The oscillator 11 drives the driver circuit 13 over leads 31 via input capacitors 33 and 35. On the positive half cycle of the oscillator's driving voltage, diode 37 and NPN transistor 39 conduct. The conduction of the transistor 39 in turn drives NPN transistor 41 into saturation and via resistor 43 drives PNP transistor 45 into saturation. Resistors 47 and 49 are connected to provide base to emitter return for transistor stability. On the negative half cycle of the oscillator's driving voltage, the reverse occurs with the diode 51 and PNP transistor 53 being driven into conduction so that PNP transistor 55 and NPN transistor 57 are driven into saturation. The transistor 57 is driven into saturation via resistor 59. Resistors 61 and 63 are connected to provide base to emitter returns for transistor stability.

In this manner of operation wherein the driver circuit 13 is driven by the oscillator 11 to alternately drive one set of transistors 39, 41, 45 and then the other set 53, 55, 57, a peak to peak amplitude is impressed across circuit points 65 which is equal to twice the D.C. supply voltage, V+. Connected between the circuit points 65 and the driver circuits output terminals 67 is a series resonant filter circuit made up of a coil 69 and a capacitor 71. The series resonant circuit functions to attenuate substantially all frequencies components except the reference frequency component so that the output signal appearing on the output terminals 67 is only the reference frequency of 26 KHz or whatever the natural resonate frequency may be.

The driver circuit output terminals 67 are connected, respectively, to a pair of signal carrying conductors of a shielded cable 73. The cable 73 has its shield grounded and a plurality of sound producing transducers 15 (shown as two sound producing transducers) are connected between the conductors of the cable 73 so as to be driven at the reference frequency by the driver circuit 13. Because of the distributed capacitance in the cable 73, higher frequency electrical signals require relatively more driving power. It is for this reason that the series resonant filter made up of the coil 69 and capacitor 71 is included in the driver 13 so that harmonics of the reference frequency are attenuated to avoid the loss of power which would be wasted in generating harmonic signals on the cable 73. Thus, much power is conserved by filtering out the reference frequency harmonics without any loss of performance. Further, by using in the driver circuit 13 the switching driver arrangement of alternately driving one set of transistors then the other, little power is dissipated in the driving transistors so that inexpensive medium power transistors may be used. Also, the reliability of the performance of the transistors is increased by the cooler operation of the transistors resulting from the high efficiency of the switching driving technique.

In use of the exemplary intruder alarm system, the sound producing transducers 15 are positioned within or adjacent to the selected area 10 to be protected at strategically spaced locations. Thereby, sound waves at the predetermined reference frequency are produced within the area 10. These sound waves 10 which are preferably ultrasonic are reflected from objects within the area 10 so that reference echo signals at the reference frequency are produced by reflection of the sound waves from stationary objects and frequency shifted echo signals are produced by reflection of the sound wave from moving objects. The frequency shifted echo signals are produced due to the doppler frequency shift of sound from a moving object. Although the frequency shift normally produced by an intruder is small as compared to the reference frequency, the doppler shifted echo signals combine with the larger steady state reference echoes to produce a doppler beat frequency which is equal to the frequency difference between the reference echo signals and the doppler shifted echo signals.

Figure 4:
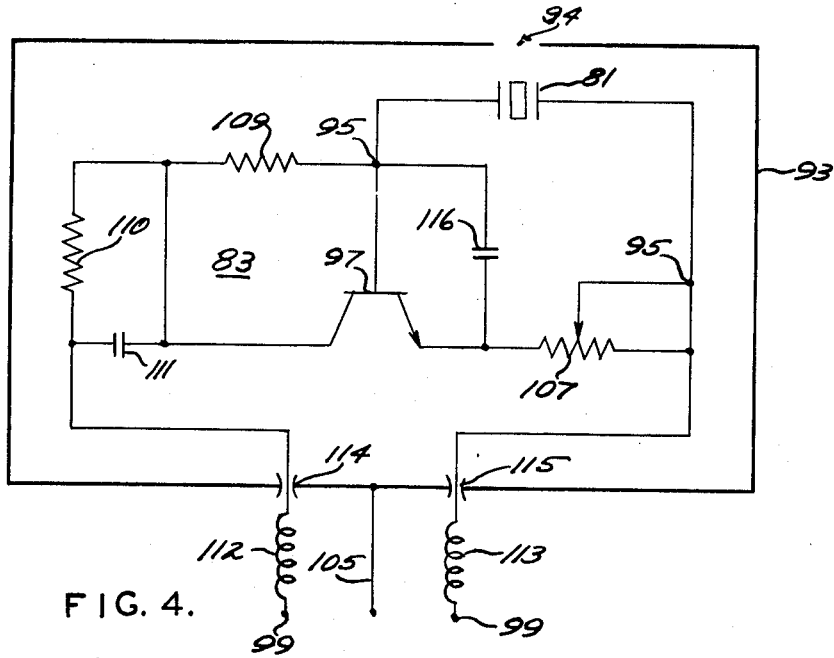
FIG. 4 is a circuit diagram of one of the remote sound sensing transducer amplifiers of FIG. 1.

As shown on FIG. 1, the intruder alarm system also includes sound sensing means made up of a plurality of sound sensing transducers or microphones 81, a transducer amplifier 83 associated with each sound sensing transducer 81, a shielded cable 85, a summed output amplifier 87, a signal processor 89 and an alarm 91. The plurality of sound sensing transducers 81, three of which are shown, are strategically spaced within or positioned relative to the area 10 to be protected so as to sense the reference echo signals and frequency shifted echo signals reflected from objects within the area 10. Each sound sensing transducer 81 is associated with a transducer amplifier 83 to form a pickup transducer assembly. The assembly formed is preferably housed in a tight metal case, such as an aluminum case. The pickup transducer assembly formed is better shown in FIG. 4 housed in its case or housing 93. The sound sensing transducer 81 is positioned in the housing 93 adjacent an opening 94 formed therein so as to be appropriately positioned for receiving sound reflected from objects within the area 10. The transducer 81 is connected across input terminals 95 of the amplifier 83 to drive the base electrode of a transistor 97. DC bias is provided to power each remote amplifier 83 through the output terminals 99 of the amplifier 83 via the pair of signal carrying conductors 101 and 103 of the shielded cable 85. One output terminal 99 of the amplifier 83 is connected to the signal carrying conductor 103 of the cable 85 by means of the electrical conductor 104. The shielding of the cable 85 is grounded and electrical conductors 105 are connected from the remote amplifier housings 93 to the shielding of the cable 85.

In operation of the pickup transducer assembly provided by each sound sensing transducer 81 with its associated amplifier 83, each transducer 81 generates very small electrical signals which correspond to the reflected echo signals from within the area 10. These electrical signals generated drive the base electrode of the transistor 97 which is of the NPN type and an adjustable or variable resistor 107 may be provided as a gain adjustment for each individual transducer assembly. Bias resistors 109 and 110 are connected in the amplifier 83 to appropriately bias the transistor 97. Capacitor 111 is provided in the amplifier 83 to connect the collector electrode of the transistor 97 to one of the signal carrying conductors of the cable 85. The amplifier 83 is of the current generator type and functions to generate electrical current signals across its output terminals 99 which correspond to the echo signals sensed by the sound sensing transducer 81. Each transducer pickup assembly functions as a current amplifier substantially isolated from electrical interference which feeds the signal carrying conductors 101 and 103 of the cable 85. The output impedance of each amplifier 83 is designed to be relatively high in comparison to the impedance terminating the cable 85. As is hereinafter explained, the cable 85 is terminated in a very low impedance by a grounded base amplifier. Series inductors 112 and 113 are included in the circuitry of the amplifier 83 along with feed-through capacitors 114 and 115 to prevent energy of the VHF frequency band from entering the transducer case 93, the case 93 itself functioning as a shield from electrical interference. In the event any such energy remains after filtration by the inductors 112, 113 and capacitances 114, 115, a capacitor 116 which is connected between the base and the emitter electrodes of the transistor 97 shunts these VHF frequencies so that no amplified VHF output signal is generated by the transistor 97.

Figure 5:
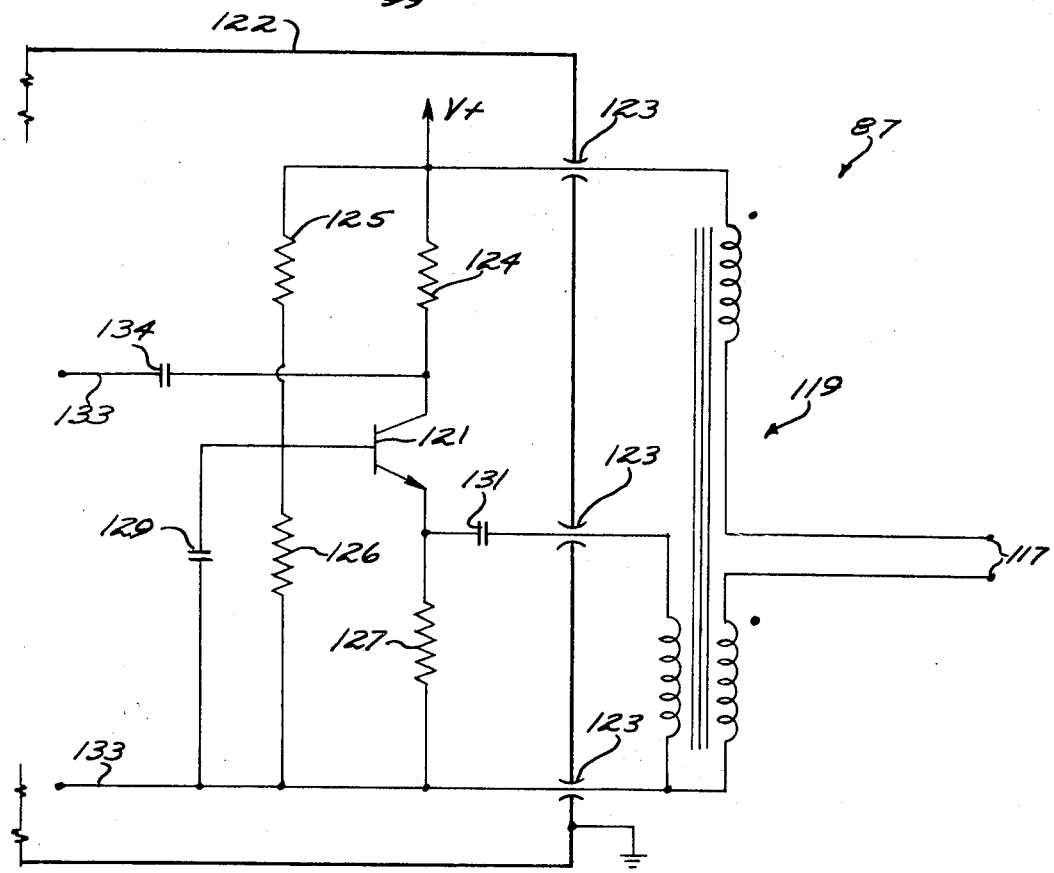
FIG. 5 is a circuit diagram of the summed output amplifier of FIG. 1.

The electrical current signals generated by the pickup transducer assemblies are summed on the cable 85 and the cable 85 is connected at terminals 117 to the summed output amplifier 87. The summed output amplifier 87 is shown in more detail in FIG. 5 and has a transformer 119 made up of two preferably bifilar wound primary coils on a ferrite core and a single secondary coil wound separately. The transformer 119 functions to provide DC power to the pickup transducer assemblies over the conductors 101, 103 of the cable 85 and also couples the electrical current signals from the remote pickup transducer assemblies to the emitter electrode of a grounded base amplifier formed by an NPN transistor 121. The transformer 119 additionally has its primary coils wound or orientated so that common mode signals induced in both the signal carrying conductors 101 and 103 cause flux generated as a result in the transformer core to be equal and opposite so as to cancel. Thereby, no voltage is induced in the secondary winding of the transformer 119 due to common mode signals, such as electrical noise, which is equally induced in the cable conductors 101 and 103. The electrical current signals from the pickup transducer assemblies which are summed on the cable conductors 101 and 103, however, cause flux in each of the primary coils of the transformer 119 which add to induce a summed signal in the secondary winding of the transformer 119.

In the summed output amplifier 87, the leakage inductance of the transformer 119 and the feed-through capacitors 123 provided by the amplifier housing 122 prevent VHF signals from reaching the transistor amplifier 121. DC supply voltage is supplied to the summed output amplifier 87 in the form of V+ and ground voltage through the bias resistors 124–127. The base electrode of the transistor 121 is grounded to the ultrasonic reference frequency of the system by the capacitor 129. The capacitor 131 connected in series with the secondary coil of the transformer 119 functions as a resonant circuit for transferring the summed electrical signals representing the sensed echo signals to the transistor amplifier 121. The summed output amplifier 87 generates a summed output signal representative of the sensed echo signals across its base-collector electrodes and is connected by means of electrical leads 133 and DC blocking capacitor 134 to the signal processor 89. Thus, the summed output amplifier 87 functions as coupling means to receive from the cable 85 summed current signals representing the detected echo signals and transfers these signals to the signal processor 89.

Figure 6:
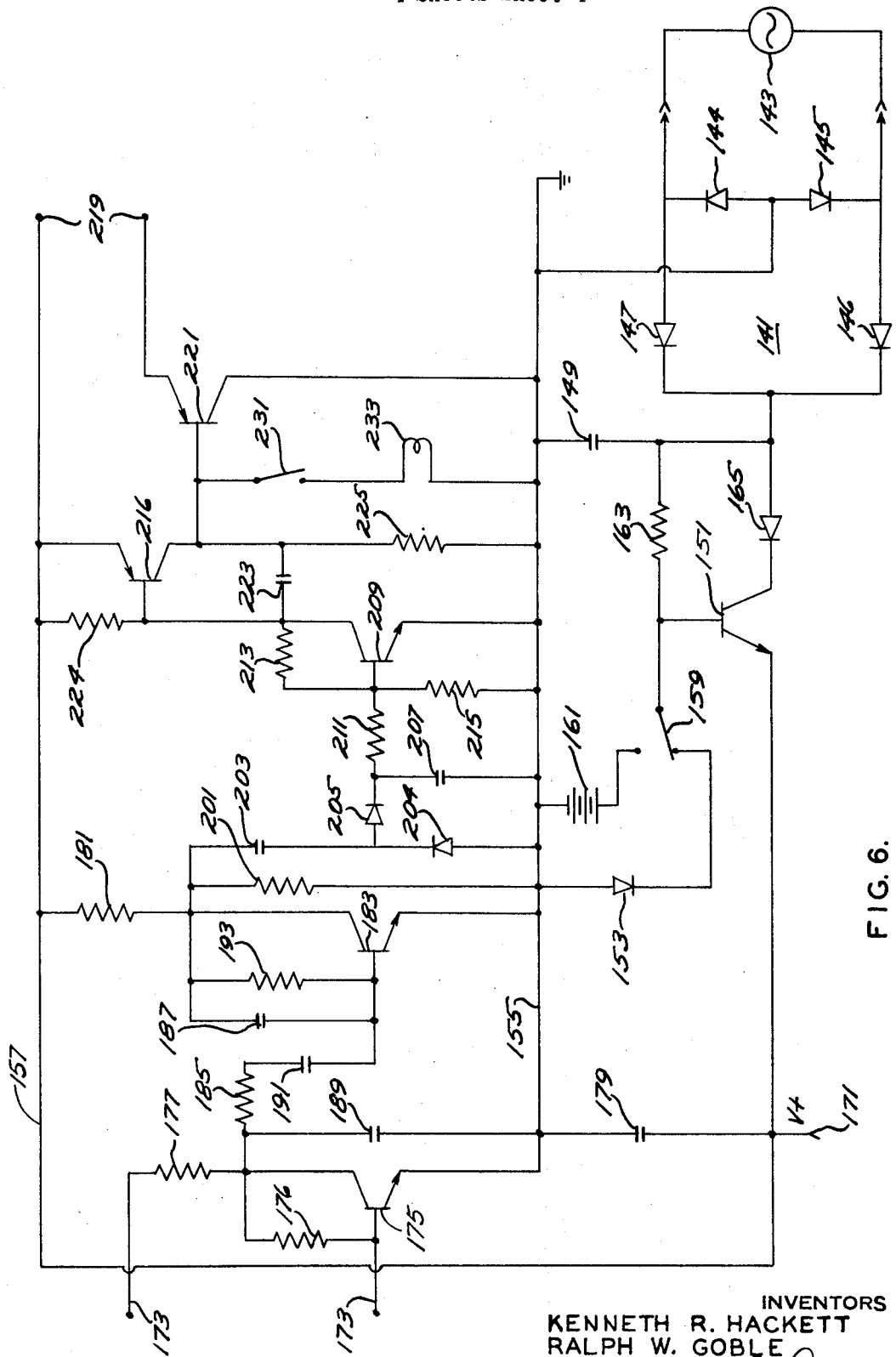
FIG. 6 is a circuit diagram of the signal processor of FIG. 1.

The signal processor 89 is shown in more detail in FIG. 6 and functions to detect the doppler beat frequency representing movement in the protected area 10, integrate the detected signal as a function of time, and amplify the detected and integrated beat frequency signal to generate an alarm actuating signal. The signal processor 89 includes a DC voltage source for supplying V+ and ground voltages. The DC voltage source identified generally by numeral 141 includes an AC voltage supply 143 connected across the input terminals of a diode bridge made up of diodes 144–147. The output terminals of the diode bridge are connected across a capacitor 149 so that the rectified signal generated by the diode bridge is filtered thereby and drives an emitter follower connected transistor 151. The base electrode of the NPN transistor 151 is connected normally through a Zener diode 153 to a voltage bus 155 of the signal processor 89. The emitter electrode of the transistor 151 is connected to the other voltage bus 157 of the processor 89; thereby DC voltage is supplied to the signal processor 89. A switch 159 is provided for connecting the base electrode of the transistor 151 through a nickel-cadmium battery 161 instead of the Zener diode 153 so that either the battery 161 or the Zener diode 153 may be used as a supply voltage reference. The voltage reference provided is normally a 12 volt reference so that V+ voltage will be plus 12 volts. Current is supplied either to the battery 161 or the Zener diode 153 via the resistor 163 which is connected between the filtering capacitor 149 and the base electrode of the resistor 151. A diode 165 is connected between the filtering capacitor 149 and the collector electrode of the transistor 151.

As before mentioned, the Zener diode 153 or the battery 161 are used for the 12 volt reference in the power supply circuit. The voltage reference is connected to the base electrode of the transistor 151 and the emitter follower connected transistor 151 supplies the DC power to the signal processor 89. Collector voltage is supplied to the transistor 151 via the diode 165. The battery 161 is used in place of the Zener diode 153 whenever standby power is needed. Thus, when AC power fails, the battery 161 may be used to supply power to the system via the base emitter path of conduction of the transistor 151. The diode 165 protects the base to collector path of conduction of the transistor 151 when the battery 161 is switched into the power supply circuit. Without the diode 165, the base to collector path of the transistor 151 would attempt to charge the filtering capacitor 149 and such a surge of current through the base to collector path of the transistor 151 would destroy the transistor 151. It is noted that a power supply terminal 171 is provided in the signal processor 89 upon which is generated the V+ voltage. The other components of the exemplary intruder alarm system may be connected to this terminal 171 in order to receive their V+ supply voltage.

In operation of the signal processor 89, the summed electrical output of the amplifier 87 is received from electrical leads 133 at input terminals 173 of the processor 89. The doppler beat frequency is detected from the summed electrical input received at terminals 173 by transistor 175 which is of the NPN type. The transistor 175 is biased by means of the bias resistors 176 and 177 to operate at a very low base current in the non-linear region. Thereby, the envelope of the summed output signal which contains the doppler beat frequency is the only component of the summed output signal which is detected by the transistor 175. This detection of the envelope of the summed output signal occurs even with large variations in the amplitude of the steady state reference echo signal received from the summed output amplifier 87. The capacitor 179 and the resistor 181 in the signal processor 89 decouples the signal processor 89 from the power supply 141.

The detected doppler beat frequency is coupled to the base of a filter amplifier formed by an NPN transistor 183 by a coupling resistor 185 and capacitor 187 which are connected to form a Miller type integrator to integrate the beat frequency signal as a function of time. An output capacitor 189 is connected between the collector and base electrodes of the transistor 175 so that the capacitor 189 with the resistor 185 and the capacitor 187 combine to form a filter which gives a substantially flat frequency response to about 50 Herz. The capacitor 189 functions to shunt the higher undesired frequencies which represent electrical noise to ground from the collector electrode of the transistor 175. Electrical signals over the frequency of 50 Herz are attenuated by this filter circuit at a rate of approximately 12 DB per octave. Thereby, a frequency response which is optimum for detecting moving objects in the nature of intruders and rejecting ambient noise and darting insects is provided. For an ultrasonic reference frequency of approximately 26 kiloHerz, a 50 Herz doppler beat frequency represents a velocity of approximately 1 foot per second. A DC blocking capacitor 191 and a bias resistor 193 are also connected in the circuitry between the detector provided by the transistor 175 and the amplifier provided by the transistor 183.

The output of the transistor 183 is generated on its collector electrode and appears across the load resistor 201. A DC blocking capacitor 203 is connected between the collector electrode of the resistor 183 and a diode pump formed by diodes 204 and 205. The amplified doppler beat signal generated on the collector electrode of the transistor 183 charges the capacitor 207 through the diode pump formed by the diodes 204 and 205 until an NPN transistor 209 is triggered into conduction by this voltage charge which is applied through a resistor 211. Bias resistors 213 and 215 are associated with the transistor 209 to determine the charge and voltage necessary to bias the transistor 209 into conduction. Conduction of the monostable transistor 209 triggers a PNP transistor 216 into conduction to energize a relay 217, shown in FIG. 1, which is connected between output terminals 219 of the signal processor 89 and through a PNP transistor 221. Regeneration occurs in the relay energizing circuit because of the feedback path provided by the resistor 213 and a capacitor 223. Bias resistors 224 and 225 are associated with the transistors 209 and 216, and the transistor 221 functions as a switch for energizing the relay 217. A manually operated switch 231 connected in series with a lamp 233 is connected between the base electrode of the transistor 221 and ground to indicate, when switch 231 is closed, whether the beat signal detected is sufficient to generate an alarm actuating signal.

It is noted that the transistors 209 and 216 remain in a triggered state as long as the detected doppler beat frequency has a sufficient magnitude to maintain the capacitor 207 charged to the predetermined voltage level necessary to trigger the transistor 209. Otherwise, the transistors 209 and 216 reset once the charge on the capacitor 207 decays to a level below this predetermined voltage level. Further, the output of the filter amplifier transistor 183 is limited by the resistor 201. The resistor 201 causes a lower DC supply voltage to be impressed across the transistor 183 to reduce its dynamic range, but not its sensitivity. Consequently, since the charging rate of the capacitor 207 is a function of the output amplitude of the amplified signal generated by the transistor 183, by limiting the amplitude of this output signal, weak beat frequency signals detected from distant moving objects are able to charge the capacitor 207 substantially as fast a rate as very large magnitude beat frequency signals due to closer moving objects. Therefore, the response time of the signal processor 89 in generating an alarm actuating signal is substantially unaffected by the extremely strong strength of the doppler frequency shifted echo signal caused by close moving objects. As shown in FIG. 1, the alarm actuating signal generated by the signal processor 89 energizes the coil of the relay 217 so as to move a solenoid operated switch 241 from its de-energized position to an alarm actuating position, thereby to energize the alarm 91 which is a conventional type of alarm.

In summary, the exemplary intruder alarm system operates to detect the motion of an intruder in a protected area 10 by generating sound at a selected reference frequency within the selected area 10 and detecting echo signals of the generated sound waves from objects within the area 10. The echo signals are detected by a plurality of electrically shielded pickup transducers including sound sensing transducers 81 and amplifiers 83 which generate electrical current signals corresponding to the detected echo signals. The electrical current signals are summed on a shielded cable 85 and coupled to a summed output amplifier 87 by a transformer means which functions to reject common mode electrical noise signals equally induced on the signal carrying conductors of the cable 85. The amplifier 87 amplifies the summed electrical signals representing the echo signals from the area 10 and transfers the summed output signal to the signal processor 89.

In the signal processor 89, the envelope of the summed output signal is detected, thereby to detect the beat signal which is the doppler beat frequency representing the movement of an object or intruder in the area 10. The signal processor 89 filters, integrates and amplifies this beat signal so that an alarm actuating signal is generated whenever a beat signal of a frequency characteristic of an intruder is detected by the signal processor 89. The alarm actuating signal which is generated whenever the detected beat signal has at least a minimum magnitude and sufficient duration operates to energize a relay means 217, thereby to actuate an alarm 91 to indicate the presence of an intruder in the area 10.

It is noted that various modifications may be made in the exemplary intruder alarm system in accordance with the present invention. Further, it is noted that the intruder alarm system described has the advantage of increasing signal to noise ratio by means of the individual remotely located amplifiers 83 which function to amplify the detected echo signals prior to adding these echo signals on the connecting cable 85. This remote amplification has the advantage of amplifying the electrical signals representing the detected echo signals in an isolated pickup housing whereat stray electrical noise is at a minimum. Thus, the electrical signals summed on the cable 85 are of greater strength so as to be less susceptible to stray electrical noise which may be encountered and induced in the signal carrying conductors of the cable 85. Further, the transformer and the summed output amplifier 87 functions to eliminate much of the stray electrical noise by common mode rejection since the stray electrical noise tends to be induced in each of the signal carrying conductors equally. Various types of filtering and shielding are provided in the system both by housings and by shielding the connecting cables to attenuate the greater portion of other electrical signals of different frequencies which may be present in the area 10 or may be influencing the exemplary intruder alarm system. Additionally, since the summed output amplifier 87 functions to terminate the cable 85 in an extremely low impedance, the effects of stray capacitance in the cable 85 are minimal because the shunt capacitive reactance of the cable 85 is much greater than the terminating impedance provided by the summed output amplifier 87. The exemplary motion detector apparatus described also has the advantage of being relatively insensitive to the strength of the doppler frequency echo signals sensed and is not driven into saturation by the presence of high magnitude steady state echo signals which may be caused by the presence of hard walls or close-in objects in the area 10 being protected.

Thus, there is provided an improved intruder alarm and motion detecting system.

What is claimed is:

1. An intruder alarm system, comprising:
   sound producing means for generating sound waves of a predetermined reference frequency, said sound producing means being positioned to generate said sound waves within a selected area to be protected whereby said sound waves are reflected from objects within said area to produce, when reflected from stationary objects, reference echo signals at said reference frequency and when reflected from moving objects frequency shifted echo signals, said frequency shifted echo signals being caused by the doppler frequency shift of sound waves from a moving object and combined with said reference echo signals to produce a beat frequency signal having a frequency equal to the difference between the frequencies of said reference echo signals and said frequency shifted echo signals;
   a plurality of sound sensing transducers positioned to sense said reference and frequency shifted echo signals reflected from objects within said area, said transducers being operable to generate a plurality of electrical outputs corresponding to said sensed echo signals;
   a plurality of amplifiers corresponding in number to said transducers, each of said amplifiers being connected with one of said transducers and being operable to amplify the electrical output of the one of said transducers, to which it is connected, whereby a plurality of amplified electrical signals are generated which correspond to said sensed echo signals;
   summing means connected to said amplifiers for summing said amplified signals whereby to generate a summed output; and
   signal processing means connected to said summing means for detecting the beat frequency signal portion of said summed output, said signal processing means being responsive to said detected beat frequency signal to generate an alarm actuating signal which indicates the presence of a moving object, hence an intruder, within said area.

2. The invention recited in claim 1, including an alarm means connected to said signal processing means, said alarm means being selectively actuated by the alarm actuating signal generated by said signal processing means.

3. The invention recited in claim 1, wherein said signal processing means includes:
   integrator and amplifier means for integrating said detected beat frequency signal and generating an amplified integrator output signal as a function of time; and
   means for generating said alarm actuating signal whenever said integrator output signal exceeds a predetermined level.

4. The invention recited in claim 3, wherein said integrator and amplifier means has an optimum range of frequency response whereby to integrate and amplify only the portion of said detected beat frequency signal characteristic of intruders while attenuating portions of said detected beat frequency signal characteristic of ambient noise and darting insects.

5. The invention recited in claim 3, wherein:
   said integrator and amplifier means has a substantially flat frequency response from zero to about 50 hertz and is operable to attenuate electrical signals above 50 hertz; and
   said means for generating said alarm actuating signal is a relay means; and including;
   an alarm connected to said relay means, said alarm being selectively actuated by said alarm actuating signal generated by said relay means.

6. The invention recited in claim 1, wherein said sound producing means includes:

a plurality of sound producing transducers positioned to generate said sound waves within said area, each of said sound producing transducers having a natural resonant frequency equal to said reference frequency;

driving oscillator means connected for driving one of said sound producing transducers; and driving circuit means connected between said oscillator means and the other ones of said sound producing transducers for being driven by said oscillator means to drive said other sound producing transducers, said driving circuit means being operable to substantially attenuate all frequencies but the reference frequency component whereby to conserve power.

7. An intruder alarm system, comprising:

a plurality of sound producing transducers designed to generate sound waves of a predetermined reference frequency, said sound producing transducers being positioned to generate said sound waves within a selected area to be protected so that said sound waves generated are reflected from objects within said area to produce when reflected from stationary objects reference echo signals at said reference frequency and when reflected from moving objects frequency shifted echo signals, said frequency shifted echo signals being caused by the doppler frequency shift of sound waves from a moving object and combining with said reference echo signals to produce a beat frequency signal having a frequency equal to the difference between the frequencies of said reference echo signals and said frequency shifted echo signals;

means for driving said sound producing transducers at said reference frequency, said driving means being operable to substantially attenuate all frequencies except said reference frequency so as to conserve power;

a plurality of sound sensing transducers positioned to sense said reference and frequency shifted echo signals reflected from objects within said area, said sound sensing transducers being operable to generate a plurality of electrical outputs corresponding to said sensed echo signals;

a plurality of current generating amplifiers corresponding in number to said sound sensing transducers, each of said amplifiers connected with one of said sound sensing transducers and being operable to generate an amplified electrical current signal corresponding to the electrical output of the one of said sound sensing transducers to which it is connected whereby a plurality of amplified electrical current signals are generated which correspond to said sensed echo signals;

a shielded cable having a pair of signal carrying conductors, the outputs of said amplifiers being connected to said signal carrying conductors so that said amplified current signals are summed on said cable to produce a summed output;

coupling means connected to said cable for receiving and transferring said summed output, said coupling means also being operable to reject common mode signals whereby to eliminate noise equally induced in both of said signal carrying conductors;

signal processing means connected to said coupling means for detecting the beat frequency signal portion of said summed output, said signal processing means being operable to integrate as a function of time said detected beat frequency signal and generate an alarm actuating signal to indicate the presence of a moving object, hence an intruder, within said area; and an alarm connected to said signal processing means which is selectively actuable by said alarm actuating signal.

8. In an intruder alarm system wherein sound of a reference frequency is generated in a selected area to be protected and a plurality of sound sensing transducers are positioned to individually sense echo signals carrying doppler beat frequencies produced by the movement of an object within said area so that the echo signals sensed by each sound sensing transducer may be summed to produce in response to the doppler beat frequency an alarm signal, the improvement of individual amplifier means substantially isolated from electrical interference connected to each sound sensing transducer to amplify each sensed echo signal prior to summing all of the sensed echo signals together whereby to improve the signal to noise ratio of the intruder alarm system.

9. An intruder alarm system comprising:

sound producing means for generating sound waves of a predetermined reference frequency, said sound producing means being positioned to generate said sound waves within a selected area to be protected whereby said sound waves are reflected from objects within said area to produce, when reflected from stationary objects, reference echo signals at said reference frequency and when reflected from moving objects frequency shifted echo signals, said frequency shifted echo signals being caused by the doppler frequency shift of sound waves from a moving object and combined with said reference echo signals to produce a beat frequency signal having a frequency equal to the difference between the frequencies of said reference echo signals and said frequency shifted echo signals;

a plurality of sound sensing transducers positioned to sense said reference and frequency shifted echo signals reflected from objects within said area, said transducers being operable to generate a plurality of electrical outputs corresponding to said sensed echo signals;

a plurality of amplifiers corresponding in number to said transducers, each of said amplifiers being connected with one of said transducers and having first and second output terminals, each of said amplifiers operating as a current generator and being operable to amplify the electrical output of the one of said transducers to which it is connected whereby a plurality of amplified electrical current signals which correspond to said sensed echo signals are generated on said output terminals of said amplifiers;

summing means connected to said amplifiers for summing said amplified current signals, said summing means including a shielded cable and coupling means for coupling said cable electrically to a signal processing means, said cable having first and second signal carrying conductors connected, respectively, to said first and second output terminals of each of said amplifiers, said coupling means terminating said cable in a low impedance whereby said low impedance terminated cable defines a low impedance load for each of said amplifiers across which said amplified current signals are generated and summed together to generate a summed output; and, signal processing means connected to said coupling means for detecting the beat frequency signal portion of said summed output of said summing means, said signal processing means being responsive to said detected beat frequency signal to generate an alarm actuating signal which indicates the presence of a moving object, hence an intruder, within said area.

10. The invention recited in claim 9, wherein said coupling means includes means for rejecting common mode signals whereby to eliminate noise equally induced in both signal carrying conductors.

11. The invention recited in claim 10, wherein said means for rejecting common mode signals includes a transformer and said coupling means is operable to amplify the electrical current signals corresponding to said sensed echo signals which are summed on said cable.

12. The invention recited in claim 11, wherein each of said transducers with its associated one of said amplifiers are enclosed in the same metal pickup housing to improve signal to noise ratio by substantially shielding said amplifiers from electrical noise and D.C. power is supplied to said amplifiers over said cable.

13. An intruder alarm system, comprising:

sound producing means for generating sound waves at a predetermined reference frequency, said sound producing means including a plurality of sound producing transducers, driving oscillator means, and driving circuit means, each of said sound producing transducers having a natural resonant frequency equal to said reference frequency, said driving oscillator means connected for driving one of said sound producing transducers, said driving circuit means connected between said oscillator means and the other ones of said sound producing transducers for being driven by said oscillator means to drive said other sound producing transducers, said driving circuit means being operable to substantially attenuate all frequencies but the reference frequency component to conserve power, said driving circuit means including two sets of transistors which are alternately driven by said oscillator means to drive said other sound producing transducers so as to reduce transistor power dissipation, said plurality of sound producing transducers being positioned to generate said sound waves within a selected area to be protected whereby said sound waves are reflected from objects within said area to produce, when reflected from stationary objects, reference echo signals at said reference frequency and when reflected from moving objects frequency shifted echo signals, said frequency shifted echo signals being caused by the doppler frequency shift of sound waves from a moving object and combined with said reference echo signals to produce a beat frequency signal having a frequency equal to the difference between the frequencies of said reference echo signals and said frequency shifted echo signals;

a plurality of sound sensing transducers positioned to sense said reference and frequency shifted echo signals reflected from objects within said area, said transducers being operable to generate a plurality of electrical outputs corresponding to said sensed echo signals;

a plurality of amplifiers corresponding in number to said transducers, each of said amplifiers being connected with one of said transducers and being operable to amplify the electrical output of the one of said transducers, to which it is connected, whereby a plurality of amplified electrical signals are generated which correspond to said sensed echo signals;

summing means connected to said amplifiers for summing said amplified signals whereby to generate a summed output; and signal processing means connected to said summing means for detecting the beat frequency signal portion of said summed output, said signal processing means being responsive to said detected beat frequency signal to generate an alarm actuating signal which indicates the presence of a moving object, hence an intruder, within said area.

14. An intruder alarm system, comprising:

sound producing means for generating sound waves of a predetermined reference frequency, said sound producing means being positioned to generate said sound waves within a selected area to be protected whereby said sound waves are reflected from objects within said area to produce, when reflected from stationary objects, reference echo signals at said reference frequency and when reflected from moving objects frequency shifted echo signals, said frequency shifted echo signals being caused by the doppler frequency shift of sound waves from a moving object and combined with said reference echo signals to produce a beat frequency signal having a frequency equal to the difference between the frequencies of said reference echo signals and said frequency shifted echo signals;

a plurality of sound pickup means positioned to sense said reference and frequency shifted echo signals reflected from objects within said area, each of said sound pickup means being positioned remotely from each other and including a sound sensing transducer and an amplifier connected to said transducer, each of said transducers being operable to generate an electrical output corresponding to said sensed echo signals, each of said amplifiers being operable to amplify the electrical output of the one of said transducers to which it is connected whereby a plurality of amplified electrical signals are generated which correspond to said sensed echo signals;

summing means connected to said amplifiers for summing said amplified signals whereby to generate a summed output; and signal processing means connected to said summing means for detecting the beat frequency signal portion of said summed output, said signal processing means being responsive to said detected beat frequency signal to generate an alarm actuating signal which indicates the presence of a moving object, hence an intruder, within said area.

15. The invention recited in claim 14, including means for shielding each of said sound pickup means from electrical interference and eliminating VHF frequencies from said amplified electrical signals generated by said amplifiers.

* * * * *